United States Patent
Fu et al.

(10) Patent No.: US 12,175,072 B2
(45) Date of Patent: Dec. 24, 2024

(54) MAPPING UI CONTROLS ON SCREEN TO KEYS

(71) Applicant: INTERNATIONAL BUSINESS MACHINES CORPORATION, Armonk, NY (US)

(72) Inventors: Lu Fu, Ningbo (CN); Jin Shi, Ningbo (CN); Jie Jiang, Ningbo (CN); Wen Juan Nie, Ningbo (CN); Ke Huan Yin, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 17/814,031

(22) Filed: Jul. 21, 2022

(65) Prior Publication Data

US 2024/0028196 A1 Jan. 25, 2024

(51) Int. Cl.
*G06F 3/0489* (2022.01)
*G06F 3/0482* (2013.01)

(52) U.S. Cl.
CPC .......... *G06F 3/0489* (2013.01); *G06F 3/0482* (2013.01)

(58) Field of Classification Search
CPC .... G06F 3/0489; G06F 3/0482; G06F 3/0238; G06F 3/04895
See application file for complete search history.

(56) References Cited

U.S. PATENT DOCUMENTS

| | | | | |
|---|---|---|---|---|
| 5,796,404 A * | 8/1998 | Gentner | ................ | G06F 3/0489 715/823 |
| 6,489,976 B1 * | 12/2002 | Patil | .................... | G06F 3/04842 715/779 |
| 6,983,424 B1 * | 1/2006 | Dutta | .................. | G06F 3/04817 715/790 |
| 7,243,309 B2 * | 7/2007 | Koay | .................... | G06F 3/0489 715/827 |
| 8,351,992 B2 * | 1/2013 | Strom | ................... | G06F 3/0445 345/169 |

(Continued)

FOREIGN PATENT DOCUMENTS

| | | |
|---|---|---|
| CN | 102239459 A | 11/2011 |
| TW | 202127222 A * | 7/2021 |
| WO | 2022087714 A1 | 5/2022 |

OTHER PUBLICATIONS

Disclosed Anonymously, "Unification of Keyboard Shortcut Events Across Heterogeneous User Interface (UI) Processes", Mar. 5, 2014, pp. 1-6.

(Continued)

*Primary Examiner* — Kieu D Vu
*Assistant Examiner* — Blaine T Basom
(74) *Attorney, Agent, or Firm* — Gavin Giraud (57) ABSTRACT

According to an exemplary embodiment of the present invention, a method is provided. The method includes identifying UI controls in a GUI for display on a screen of a computing device. The method further includes determining a position relationship of the UI controls. The method further includes mapping the UI controls to keyboard areas such that a position relationship of the keyboard areas corresponds with the position relationship of the UI controls. One or more keys within the individual areas are associated with the UI controls that are mapped to the respective keyboard areas.

14 Claims, 7 Drawing Sheets

(56) References Cited

U.S. PATENT DOCUMENTS

| | | | | |
|---|---|---|---|---|
| 8,542,192 | B2* | 9/2013 | Onda | G06F 3/0489 |
| | | | | 345/169 |
| 8,707,210 | B2* | 4/2014 | Huang | H04N 21/4782 |
| | | | | 345/169 |
| 8,977,966 | B1* | 3/2015 | Saurav | G06F 3/0489 |
| | | | | 715/854 |
| 11,403,362 | B1* | 8/2022 | Liu | G06F 3/023 |
| 2007/0002026 | A1* | 1/2007 | Sadler | G06F 3/04895 |
| | | | | 345/168 |
| 2009/0313581 | A1* | 12/2009 | Martin | G06F 3/04892 |
| | | | | 715/827 |
| 2013/0154937 | A1 | 6/2013 | Park | |
| 2015/0058776 | A1* | 2/2015 | Liu | G06F 3/0238 |
| | | | | 715/771 |
| 2017/0075430 | A1 | 3/2017 | Hughes | |
| 2022/0391234 | A1* | 12/2022 | Potter | G06F 9/453 |
| 2023/0418466 | A1* | 12/2023 | Proulx | G06T 11/60 |

OTHER PUBLICATIONS

Hickey, "Screen Reader Plus Keyboard Helps Blind, Low-Vision Users Browse Modern Webpages", https://www.sciencedaily.com/releases/2018/04/180418141333.htm, Apr. 18, 2018, pp. 1-9.

Khurana et al., "Nonvisual Interaction Techniques at the Keyboard Surface", https://dl.acm.org/doi/abs/10.1145/3173574.3173585, CHI April 21-26, 2018, Montreal, QC, Canada, pp. 1-12.

McCloskey, "Keyboard-Only Navigation for Improved Accessibility", https://www.nngroup.com/articles/keyboard-accessibility/, Apr. 6, 2014, pp. 1-10.

Mell et al., "The NIST Definition of Cloud Computing", National Institute of Standards and Technology, Special Publication 800-145, Sep. 2011, pp. 1-7.

Webaim, "Keyboard Accessibility", https://webaim.org/techniques/keyboard/, accessed Jun. 7, 2022, pp. 1-5.

\* cited by examiner

MAPPING UI CONTROLS ON SCREEN TO KEYS

BACKGROUND

The present disclosure relates to user interface (UI) controls, and more particularly, to a method of mapping user interface (UI) controls on a screen to keys on a keyboard.

Currently, visually impaired computer users mainly rely on the use of two methods to interact with a user interface (UI) of an electronic device display: a Tab key and/or shortcut keys grouped by classification (e.g. links, buttons, etc.) provided by a screen reader application. In the first scenario, the visually impaired computer users must press the Tab key repeatedly to shift through many intervening UI controls before an intended UI control can be reached. In the second scenario, where shortcut keys provided by the screen reader are grouped by classification, the visually impaired computer users must press the keyboard prompting the classification prior to pressing a shortcut key. However, little directional knowledge about the layout of the UI can be gleaned through interacting with the UI. It is time consuming and difficult for the visually impaired computer users to familiarize themselves with the UI and develop efficiency of use (e.g., speed of operation).

SUMMARY

According to one embodiment of the present disclosure, there is provided a computer-implemented method. The method comprises recognizing UI controls in a GUI displayed on a screen of a computing device. The method further comprises determining position relationship of the UI controls on the screen. The method further comprises mapping the UI controls respectively to individual areas on a keyboard of the computing device, such that position relationship of the areas is in alignment with position relationship of the UI controls. And the method comprises associating one or more keys within the individual areas with individual UI controls that are mapped to the individual areas.

According to another embodiment of the present disclosure, there is provided a system comprising one or more processors and a computer-readable memory coupled to the one or more processors. The computer-readable memory comprises instructions for recognizing UI controls in a GUI displayed on a screen of a computing device; determining position relationship of the UI controls on the screen; mapping the UI controls respectively to individual areas on a keyboard of the computing device, such that position relationship of the areas is in alignment with position relationship of the UI controls; and associating one or more keys within the individual areas with individual UI controls that are mapped to the individual areas.

According to still another embodiment of the present disclosure, there is provided a computer program product. The computer program product comprises a computer readable storage medium having program instructions embodied therewith. The program instructions are executable by a processor to cause the processor to perform actions of recognizing UI controls in a GUI displayed on a screen of a computing device; determining position relationship of the UI controls on the screen; mapping the UI controls respectively to individual areas on a keyboard of the computing device, such that position relationship of the areas is in alignment with position relationship of the UI controls; and associating one or more keys within the individual areas with individual UI controls that are mapped to the individual areas.

BRIEF DESCRIPTION OF THE DRAWINGS

The following detailed description, given by way of example and not intended to limit the exemplary embodiments solely thereto, will best be appreciated in conjunction with the accompanying drawings, in which.

It is to be understood that the included drawings are not necessarily drawn to scale/proportion. The included drawings are merely schematic examples to assist in understanding of the present invention and are not intended to portray fixed parameters. In the drawings, like numbering may represent like elements.

DETAILED DESCRIPTION

Exemplary embodiments of the present invention are disclosed hereafter. However, it shall be understood that the scope of the present invention is dictated by the claims. The disclosed exemplary embodiments are merely illustrative of the claimed system, method, and computer program product. The present invention may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present invention, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present invention according to various exemplary embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
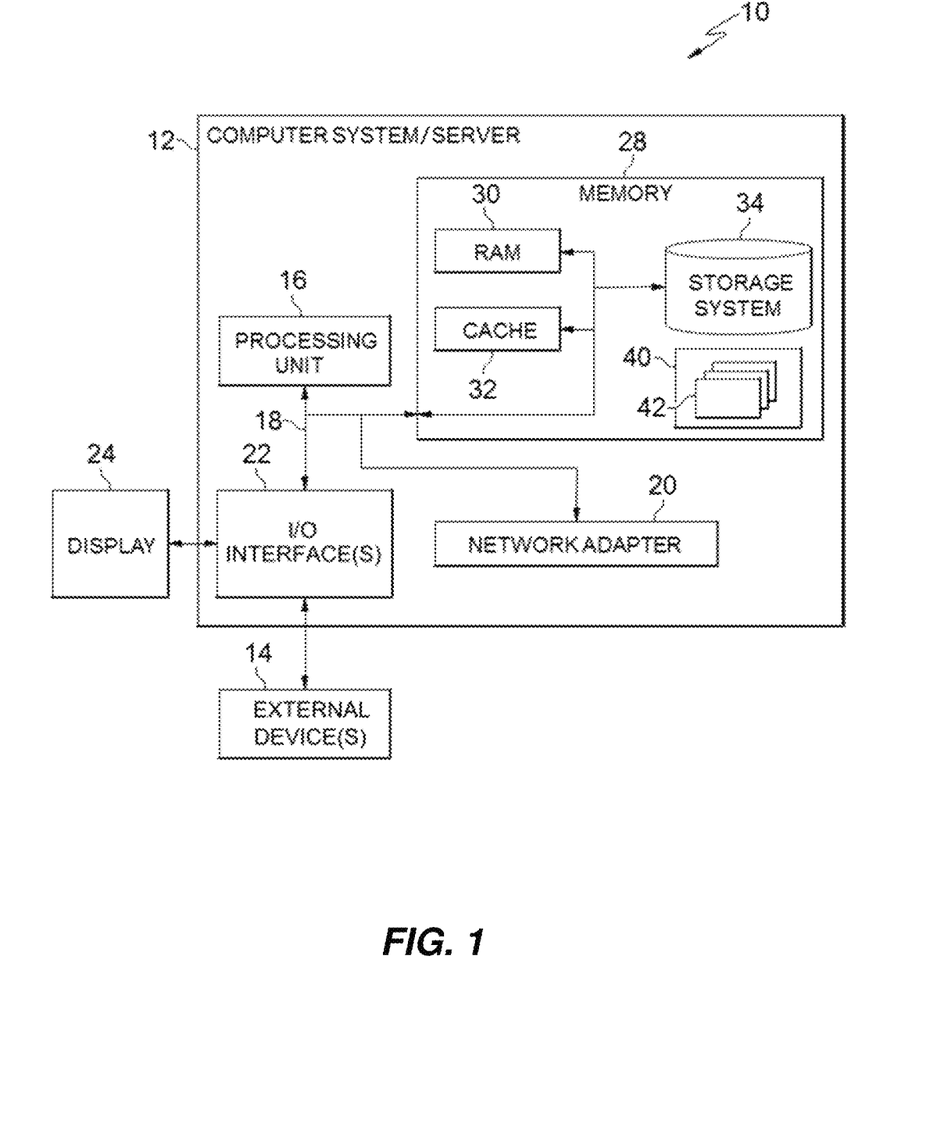
FIG. 1 depicts a cloud computing node, according to an exemplary embodiment of the present invention.

Referring now to FIG. 1, a schematic of an example of a cloud computing node is shown, according to an exemplary embodiment of the present invention. Cloud computing node 10 is only one example of a suitable cloud computing node and is not intended to suggest any limitation as to the scope of use or functionality of embodiments of the present invention described herein. Regardless, cloud computing node 10 is capable of being implemented and/or performing any of the functionalities set forth herein.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be included in both local and remote computer system storage media including memory storage devices.

As shown in FIG. 1, computer system/server 12 in cloud computing node 10 is in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 may communicate with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
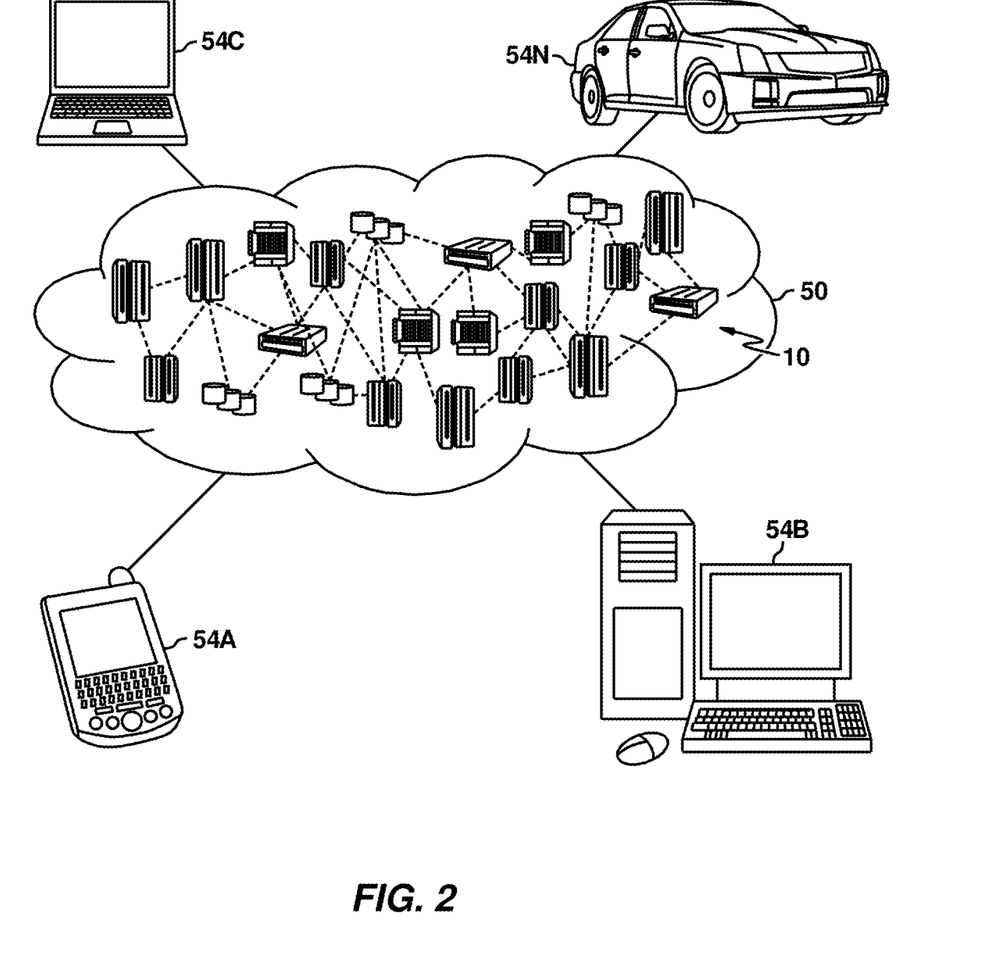
FIG. 2 depicts a cloud computing environment, according to an exemplary embodiment of the present invention.

Referring now to FIG. 2, an illustrative cloud computing environment 50 is depicted, according to an exemplary embodiment of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
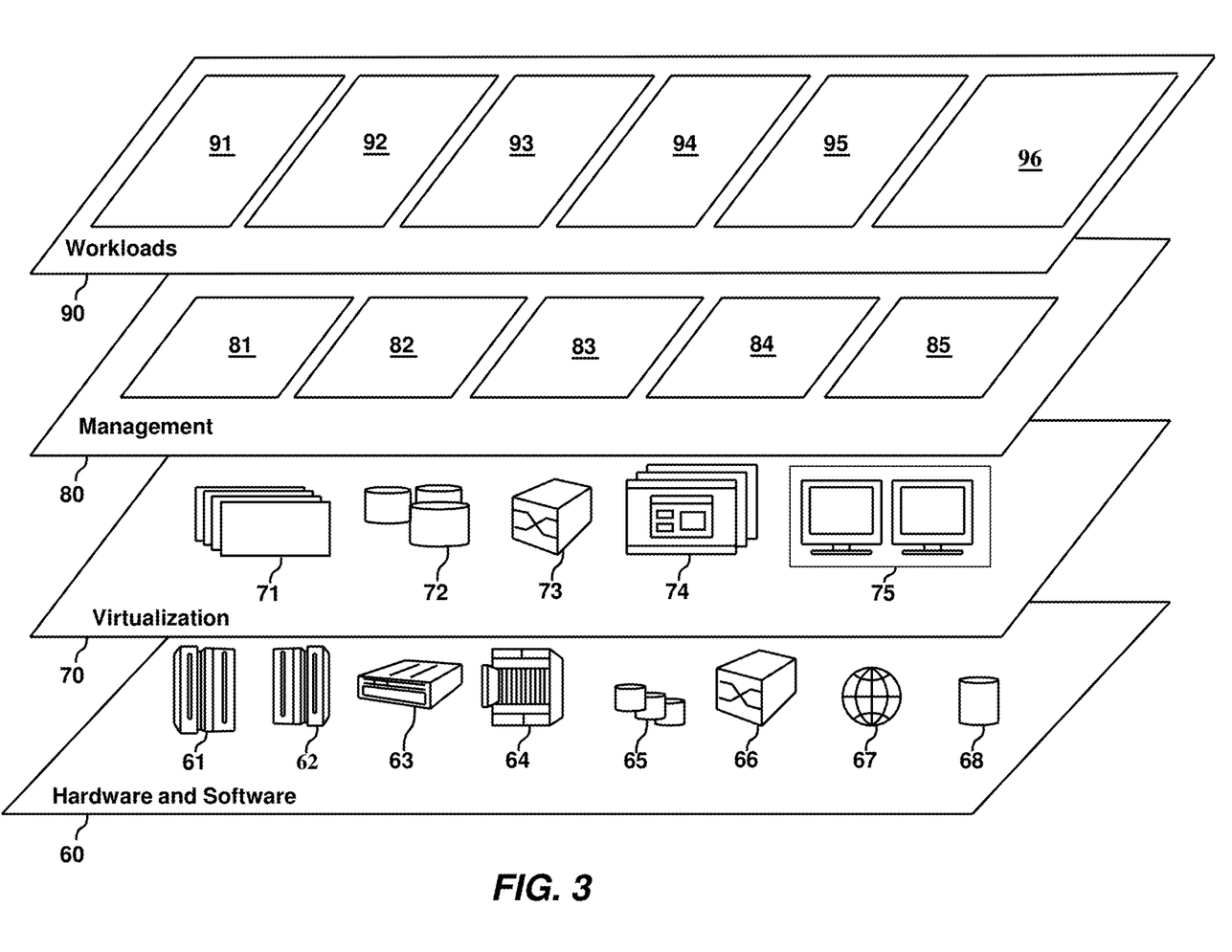
FIG. 3 depicts abstraction model layers, according to an exemplary embodiment of the present invention.

Referring now to FIG. 3, a set of functional abstraction layers provided by cloud computing environment 50 (FIG. 2) is shown, according to an exemplary embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mapping UI controls on a screen to keys 96.

Embodiments of the present disclosure include a method of mapping the UI controls on the screens to keyboard keys, thus providing users (e.g., visually impaired people) more effective interaction with the UI controls by using the keyboard keys.

Figure 4:
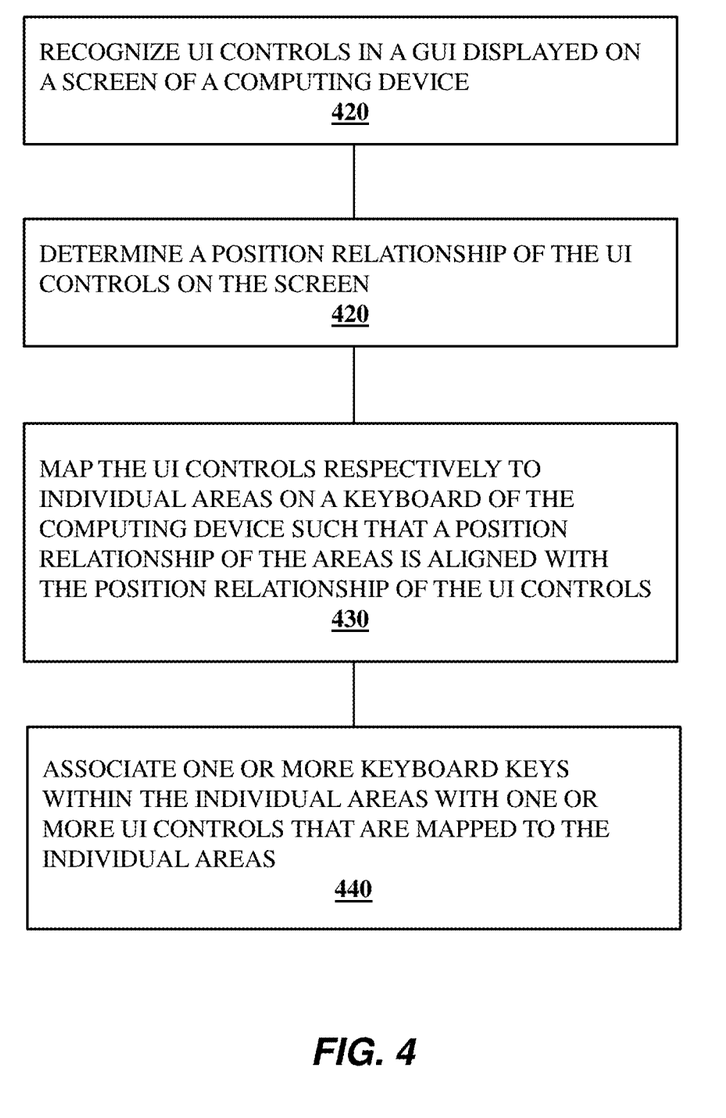
FIG. 4 is a flowchart of a method, according to an exemplary embodiment of the present invention.

Referring to FIG. 4, a flowchart is shown of a computer-implemented method 400 according to an exemplary embodiment of the present invention. The method 400 includes steps 410 to 440 that may be executed by one or more processors. As an overview, the steps are listed below:
- (410) recognizing UI controls in a GUI displayed on a screen of a computing device;
- (420) determining a position relationship of the UI controls on the screen;
- (430) mapping the UI controls respectively to individual areas on a keyboard of the computing device, such that a position relationship of the individual areas is in alignment with the position relationship of the UI controls; and
- (440) associating one or more keyboard keys within the individual areas with one or more UI controls that are mapped to the individual areas.

The process of method 400 may start when a graphical user interface (GUI), such as a webpage, is displayed on a screen of a computer during computer use.

Figure 5:
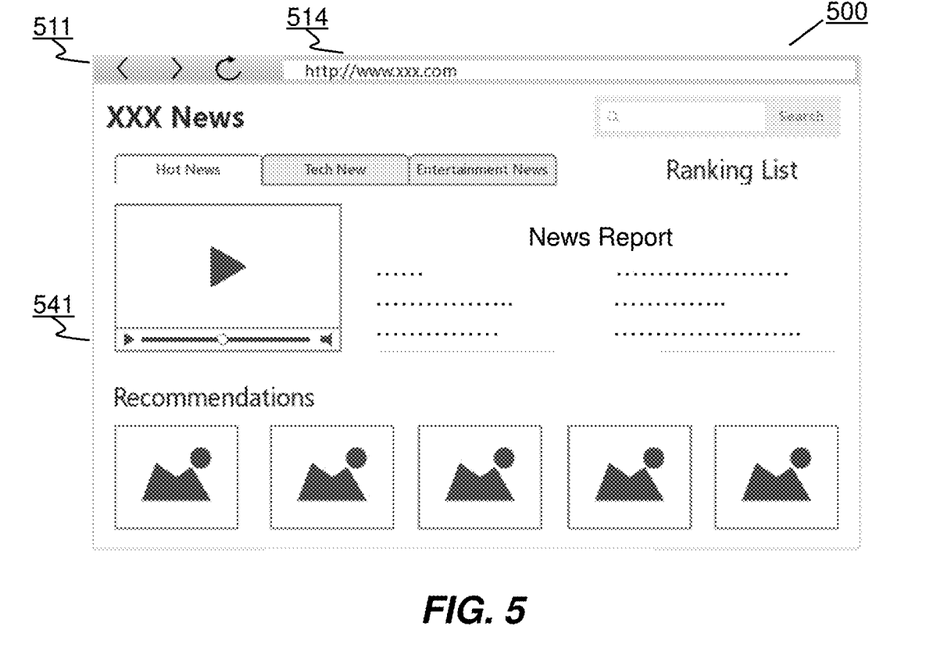
FIG. 5 depicts an example graphical user interface (GUI), according to an exemplary embodiment of the present invention.

Referring to FIG. 5, an example GUI 500 is illustrated, according to an exemplary embodiment of the present invention. As shown, there are a plurality of UI controls displayed in GUI 500, for example, a control button 511, a search box 514, a video button 541. In the context of the present disclosure, the term "UI control", also called UI element, may refer to any type of GUI textual and graphic element or a tiny application that can display information and/or interact with a user of the computing device. Examples include but are not limited to: buttons (such as command buttons, option buttons, radio buttons, and push buttons, etc.), search boxes, text boxes, list boxes, combo boxes, message boxes, scrolling controls, scroll bar controls, split bar controls, multimedia controls, dialog box controls, edit controls, dialog box elements, icons, sliders, value sets, linked text, text frames, captions, windows, child windows, window elements, menus, menu elements, menu commands, menu items and the like, etc.

At step 410, UI controls in a GUI displayed on a screen of the computing device are recognized.

Figure 6A:
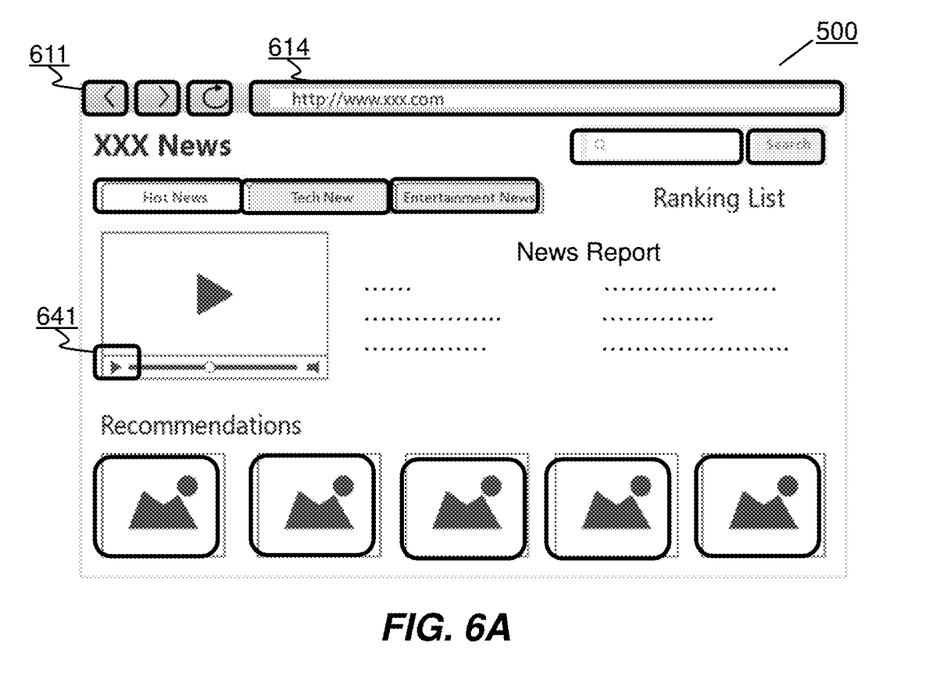
FIG. 6A illustrates a process of the method of FIG. 4, according to an exemplary embodiment of the present invention.

The operation of step 410 may be implemented with any existing technologies. For example, any known image recognition technologies may be employed to recognize icons of UI controls. Icons may be compared with those found in similar GUIs. Semantic analysis techniques may be employed to analyze any textual information around the icons. Additionally, or alternatively, codes of the application that generate the GUI may be parsed, including code corresponding to UI controls. In this way, UI controls may be recognized. The type of individual UI controls may be identified. The outcome of step 410 is illustrated according to the exemplary embodiment depicted in FIG. 6A. FIG. 6A illustrates a plurality of blocks at different locations in GUI 500. The plurality of blocks represent UI controls at the locations that are recognized at step 410. For example, blocks 611, 614 and 641 respectively represent UI controls 511, 514 and 541, among others, that are recognized at step 410.

At step 420, the position relationship of the UI controls on the screen is determined. For example, information about location (such as X-Y coordinate on the screen, areas in a grid overlay, etc.) and size (e.g., pixels, centimeters, inches, etc.) of each of the UI controls recognized in step 410 may be determined. Based on the information, a position relationship of any two UI controls may be determined. The position relationship may include distance, angle, and/or relative direction. In this way, the position relationship of the UI controls recognized at step 410 may be determined.

Figure 6B:
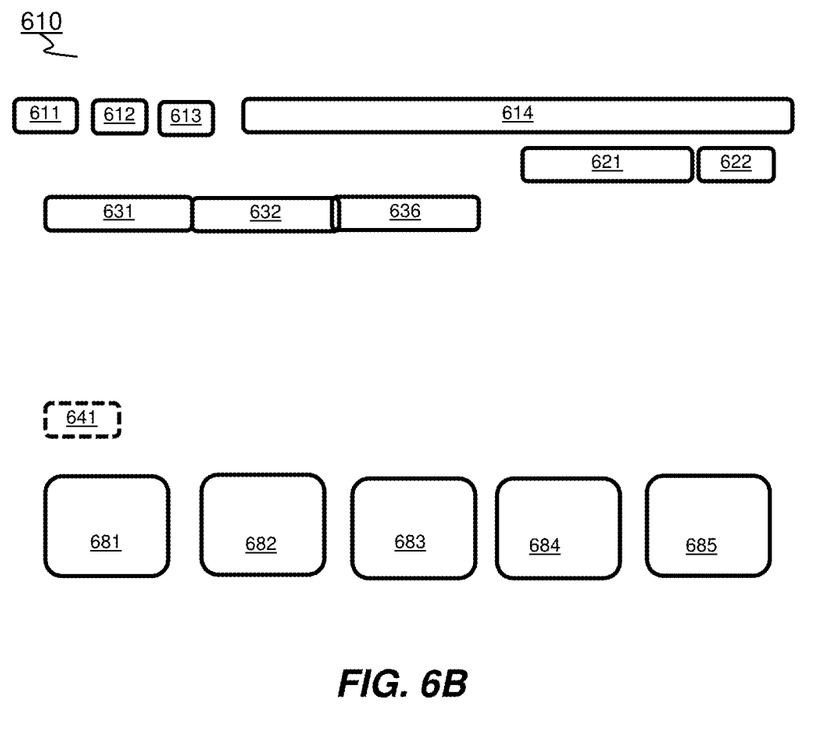
FIG. 6B depicts UI controls recognized, according to another exemplary embodiment of the present invention.

FIG. 6B illustrates the UI controls recognized at step 410. Specifically, FIG. 6B illustrates a set of blocks 610 including the plurality of blocks shown in FIG. 6A. Thus, the blocks in the block set 610 also represent all UI controls recognized at step 420. Specifically, a dot line block 41 represents video button 541. Other solid line blocks 611, 612, 613, 614, 621, 622, 631, 632, 633, 681, 682, 683, 684, 685 represent a subset of all UI controls recognized at step 420. As will be discussed below, they will be mapped to corresponding areas on a keyboard (shown in FIG. 7).

At step 430, the UI controls are respectively mapped to individual areas on a keyboard of the computing device, such that a position relationship of the areas is in alignment and/or corresponds with the position relationship of the UI controls.

The UI controls may be mapped to corresponding keyboard areas in various ways. For example, coordinate mapping relationship between the X-Y coordinates of the screen and the X-Y coordinates of the keyboard may be determined first. Then, the UI controls may be mapped to corresponding keyboard areas according to the coordinate mapping relationship. In another embodiment, UI controls may be mapped to corresponding keyboard areas according to relative screen location (e.g., quadrant, sextant, etc.). In another embodiment, a virtual grid overlay of the UI may be generated/determined including a plurality of units (e.g., boxed areas). A minimum unit may represent a dimension of the smallest recognized UI control. Each UI control may correspond to a plurality of minimum units. A virtual grid overlay of the keyboard may be similarly generated/determined. The virtual grid overlay of the keyboard and associated units may be proportioned to dynamically encompass displayed UI controls. The virtual grid overlay of the UI and/or the keyboard may be shown to the user with the mapped areas (e.g., color coded units, lines, etc.).

Figure 7:
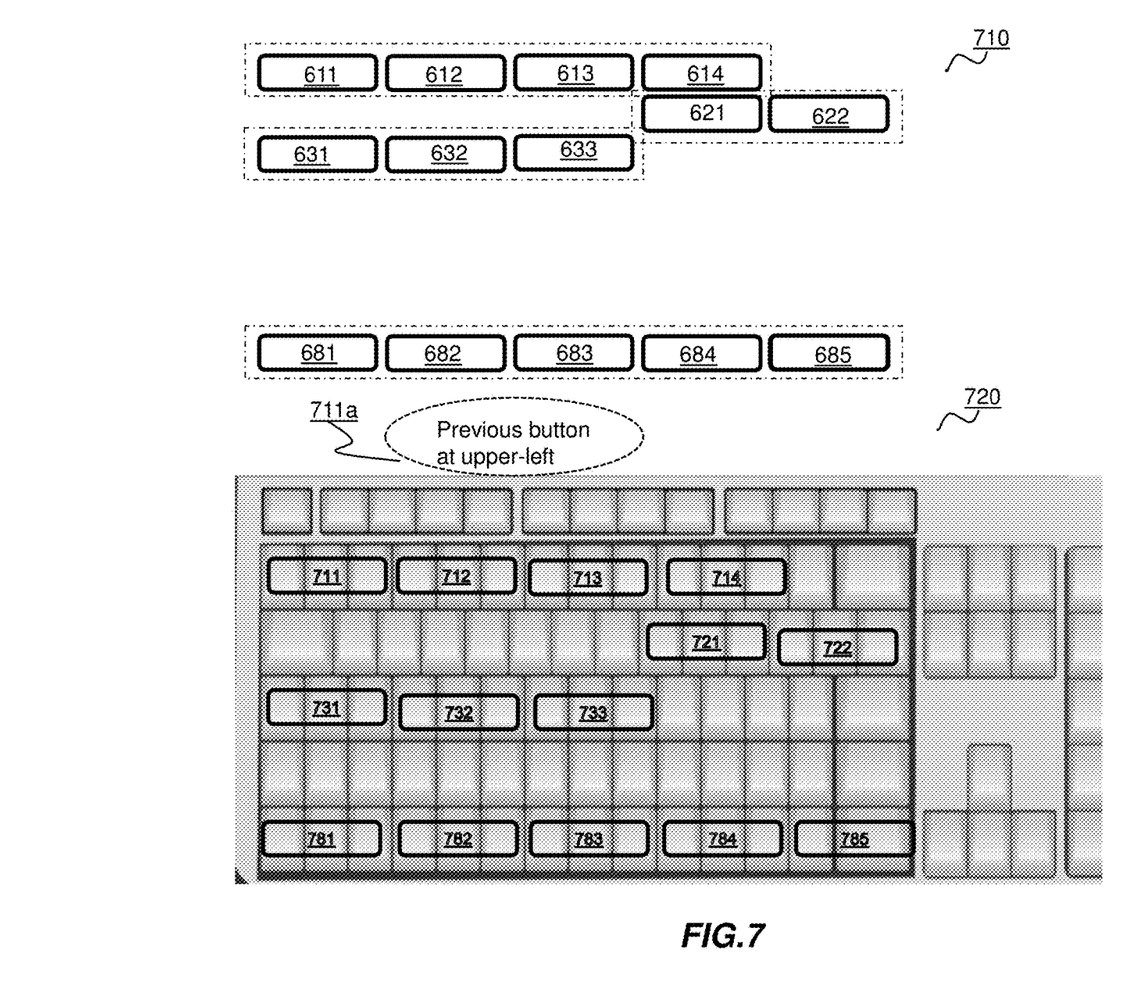
FIG. 7 illustrates the mapping of UI controls to keyboard areas, according to an exemplary embodiment of the present invention.

With reference to FIG. 7, the mapping of the UI controls to keyboard areas is illustrated, according to an exemplary embodiment of the present invention. FIG. 7 illustrates a set of blocks 710. The set of blocks 710 represents all UI controls selected to be mapped to individual areas on a keyboard. The set of blocks 710 include all blocks in the set 610 except for block 641. This means that a portion of the UI control 541 might not be mapped to any keyboard area.

According to an exemplary embodiment of the present invention, the UI controls mapped to the individual areas may be a subset of the recognized UI controls selected according to the type of individual UI controls identified when the UI controls are recognized. For example, video button 541 shown in FIG. 5 is recognized at step 410, as depicted by block 141 in FIG. 6A and FIG. 6B. Based on its type, video button 541 will not be selected, because the video content corresponding to video button 541 is not needed for the visually impaired users. As shall be appreciated, this can save keyboard space when mapping UI controls to keyboard areas, as discussed below.

It is also noted the size of a block in the set of blocks 710 may be different from the size of its corresponding block in the set of blocks 610. The difference in block size is in accordance with an embodiment of the present invention, as will be discussed below.

According to the embodiment of the present invention, the size of each of UI controls may be normalized prior to mapping to keyboard areas. For an example, both block 611 in block set 610 of FIG. 6B and block 711 in block set 710 of FIG. 7 represent UI control 411 shown in FIG. 5. The size of block 611 in block set 610 also represents the size of UI control 411. The size of block 611 in block set 710, which looks larger than the size of block 611 in block set 610, represents the normalized size of UI control 411. In this example, the size of UI control 411 is normalized to an increased size. For another example, the size of UI control 414, represented by the size of block 614 in block set 610 of FIG. 6B, may be normalized to a decreased size as represented by the size of block 614 in block set 710 of FIG. 7.

This can be done by adjusting the length and width of each element while its center is kept unchanged. As shall be appreciated, the size normalization may prevent some oversized UI controls from taking too much keyboard space if they are mapped to the keyboard. This may ensure that the keyboard can cover as many UI controls as possible.

According to an embodiment of the present invention, the distances between the UI controls may be adjusted. It may be done by scaling the distances by ratio. It also may be done by reducing or increasing the distances between the UI controls while keeping their relative location relationship unchanged. The distances may be adjusted such that they become more uniform and a layout of the UI controls becomes more compact.

According to an embodiment of the present invention, the size normalization and/or distance adjustment may be done in a way such that the relative locations of the UI controls may be described directionally, such as eight directions (e.g., up, down, right, left, upper-right, upper-left, lower-right, and lower-left).

After the adjustment as described, the UI controls may be mapped to a keyboard 720 of the computing devices. Keyboard 720 is depicted in FIG. 7 with numbered areas to represent different areas in the keyboard. For example, area 711 is an area in the upper-left of keyboard 720. Specifically, area 711 corresponds to UI control 611. In other words, at step 430, UI control 611 is mapped to area 711. Similarly, UI controls 612, 613, 614, 621, 622, 631, 632, 633, 681, 682, 683, 684 and 685 are respectively mapped to individual areas 712, 713, 714, 721, 722, 731, 732, 733, 781, 782, 783, 784 and 785.

According to an embodiment of the present invention, each of the areas may contain one or more keys (e.g., keyboard keys). As can be noticed, in the instant case, area 711 contains three keys. Another area 785 contain two keys.

After step 430, step 440 is performed, which will associate one or more keys within the individual areas with one or more UI controls that are mapped to the individual areas. As a result, pressing any of the one or more keys is equivalent to clicking or otherwise operating at least one UI control mapped to the area containing the one or more keys.

According to an embodiment of the present invention, the one or more keys contained in each of the areas with the UI control are exclusively mapped to the area. This means that each of the keys is only associated with one UI control. In other words, no key will be shared by two different areas, such as adjacent area 781 and area 782.

In operation, a user is enabled to toggle between an operational mode of and a normal mode of keyboard 720. For example, a particular key (not shown) may be defined to function as a toggle key. In the normal mode, keyboard 720 functions as an ordinary keyboard. If the toggle key is pressed, keyboard 720 will function in the operation mode.

In the operation mode, the user may press one or more keys within an area on keyboard 720 to operate on a UI control associated with the area. For example, if the user presses any key contained in area 711 of keyboard 720, the user action is equivalent to directly left clicking UI control 11 that is mapped to area 711. A quick tap twice may correspond to a right click. In an embodiment in which a key has multiple UI controls (e.g., overlapping units), the key may be held for a predetermined duration to select a highlighted UI control.

Then, if the toggle key is pressed in the operation mode, keyboard 720 will be resumed to the normal mode.

According to an embodiment of the present invention, the method 400 may include the provision of audible prompting messages about the mapping of the areas to the UI controls to guide the visually impaired user. For example, in the operation mode, the method 400 may audibly signify one of the areas and its associated UI control. For example, a voice message "previous button at upper-left" 711a, as illustrated in FIG. 7, may be uttered out via a speaker equipped in the computing device. Alternatively, the voice message may be "'Previous' button at Q-W-E". At the prompting voice message, the visually impaired user may press the key Q or W or E to activate the UI control 11, which is a 'Previous' button in the instant case, on the screen. This kind of prompting voice message may be repeatedly provided with respect to other UI controls, for example, a voice message "'recommendation panel' at bottom" will inform the user to press keys within areas 781, 782, 783, 784 and 785 at the bottom of the keyboard 720 to operate on the recommendation panel in GUI 500.

In this way, the visually impaired user may have an overall picture of whole UI controls as if the GUI 500 were being viewed.

Various embodiments of the present invention have been described in the above. With the description, advantages of the present invention may become more evident. With the solution of mapping UI controls to keyboard areas according to the present invention, a visually impaired user is enabled to access UI controls by mapping, and the user may directly switch between two UI controls simply by clicking corresponding keys. Compared to using the Tab key and shortcut keys to operate the UI controls, the operation speed and intuitiveness may be greatly increased.

In addition to speed of use improvement, embodiments of the present invention may enable the user to gain basic directional knowledge about the layout of UI controls. Therefore, the user can gain familiarity with the UI layout and locate a target UI control more quickly as the user is interacting with the UI. In contrast, this sense of familiarity cannot be gained via the Tab or shortcut keys.

It is also to be noted that the process of mapping may be executed dynamically, this may save the work of programming in advance for special keys such as the Tab key and the shortcut keys.

It should be noted that the processing of mapping UI controls on a screen to keys according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present invention. Therefore, the exemplary embodiments of the present invention have been disclosed by way of example and not by limitation.

What is claimed is:

1. A computer-implemented method, comprising:
   identifying, by one or more processors, user interface (UI) controls in a graphical user interface (GUI) for display on a screen of a computing device, the UI controls including at least a first UI control and a second UI control;
   determining, by one or more processors, size and position of each of the UI controls in the GUI, wherein the first UI control has a first size and a first position in the GUI and the second UI control has a second size and a second position in the GUI, the first size being larger than the second size;
   generating, by one or more processors, a plurality of blocks, wherein each block corresponds to a respective UI control of the UI controls and has a size and position based on the determined size and position, respectively, of the corresponding UI control, wherein the plurality of blocks comprises a first block corresponding to the first UI control and a second block corresponding to the second UI control, the size of the first block being larger than the size of the second block;
   normalizing, by one or more processors, the sizes of at least some of the blocks to a uniform size, including normalizing the size of the first block and the size of the second block to an equal size;
   after normalizing the sizes of at least some of the blocks, mapping, by one or more processors, the plurality of blocks to a plurality of keyboard areas such that each keyboard area is mapped to a respective block and has a size and position based on the size and position, respectively, of the block, wherein each keyboard area comprises a plurality of adjacent keys; and
   for each UI control, identifying, by one or more processors, the block corresponding to the UI control and identifying the keyboard area mapped to the identified block, and associating the plurality of keys of the identified keyboard area with the UI control such that selection of any one of the plurality of keys selects the UI control.

2. The computer-implemented method of claim 1, wherein the identifying of the UI controls comprises:
   identifying, by one or more processors, a type of each of the UI controls.

3. The computer-implemented method of claim 2, wherein mapping the plurality of blocks to a plurality of keyboard areas comprises:
   selecting a subset of the plurality of blocks such that each block in the subset corresponds to a same type of UI control; and
   mapping, by one or more processors, the blocks in the subset to the plurality of keyboard areas.

4. The computer-implemented method of claim 1, further comprising:
   providing, by one or more processors, audible messages for each UI control about the plurality of keys associated with the UI control.

5. The computer-implemented method of claim 1, wherein for each UI control the plurality of keys associated with the UI control are exclusively associated with the UI control.

6. A system comprising:
   one or more processors; and
   a computer-readable memory coupled to the one or more processors, the computer-readable memory comprising instructions for:
   recognizing user interface (UI) controls in a graphical user interface (GUI) displayed on a screen of a computing device, the UI controls including at least a first UI control and a second UI control;
   determining a size and position of each of the UI controls on the screen, wherein the first UI control has a first size and a first position on the screen and the second UI control has a second size and a second position on the screen, the first size being larger than the second size;
   generating a plurality of blocks, wherein each block corresponds to a respective UI control of the UI controls and has a size and position based on the determined size and position, respectively, of the corresponding UI control, wherein the plurality of blocks comprises a first block corresponding to the first UI control and a second block corresponding to the second UI control, the size of the first block being larger than the size of the second block;
   normalizing the sizes of at least some of the blocks to a uniform size, including normalizing the size of the first block and the size of the second block to an equal size;
   after normalizing the sizes of at least some of the blocks, mapping the plurality of blocks to a plurality of keyboard areas such that each keyboard area is mapped to a respective block and has a size and position based on the size and position, respectively, of the block, wherein each keyboard area comprises a plurality of adjacent keys; and
   for each UI control, identifying the block corresponding to the UI control and identifying the keyboard area mapped to the identified block, and associating the plurality of keys of the identified keyboard area with the UI control such that selection of any one of the plurality of keys selects the UI control.

7. The system of claim 6, wherein recognizing UI controls comprises identifying the type of each of the UI controls.

8. The system of claim 7, wherein mapping the plurality of blocks to a plurality of keyboard areas comprises:
   selecting a subset of the plurality of blocks such that each block in the subset corresponds to a same type of UI control; and
   mapping the blocks in the subset to the plurality of keyboard areas.

9. The system of claim 6, the computer-readable memory comprising further instructions for:
   providing audible prompting messages for each UI control about the plurality of keys associated with the UI control.

10. The system of claim 6, wherein for each UI control the plurality of keys associated with the UI control are exclusively associated with the UI control.

11. A computer program product comprising a computer readable storage medium having program instructions embodied therewith, the program instructions executable by a processor to cause the processor to perform actions of:

recognizing user interface (UI) controls in a graphical user interface (GUI) displayed on a screen of a computing device the UI controls including at least a first UI control and a second UI control;

determining a size and position of each of the UI controls on the screen, wherein the first UI control has a first size and a first position on the screen and the second UI control has a second size and a second position on the screen, the first size being larger than the second size;

generating a plurality of blocks, wherein each block corresponds to a respective UI control of the UI controls and has a size and position based on the determined size and position, respectively, of the corresponding UI control, wherein the plurality of blocks comprises a first block corresponding to the first UI control and a second block corresponding to the second UI control, the size of the first block being larger than the size of the second block;

normalizing the sizes of at least some of the blocks to a uniform size, including normalizing the size of the first block and the size of the second block to an equal size;

after normalizing the sizes of at least some of the blocks, mapping the plurality of blocks to a plurality of keyboard areas such that each keyboard area is mapped to a respective block and has a size and position based on the size and position, respectively, of the block, wherein each keyboard area comprises a plurality of adjacent keys; and for each UI control, identifying the block corresponding to the UI control and identifying the keyboard area mapped to the identified block, and associating the plurality of keys of the identified keyboard area with the UI control such that selection of any one of the plurality of keys selects the UI control.

12. The computer program product of claim 11, wherein recognizing UI controls comprises identifying the type of each of the UI controls.

13. The computer program product of claim 12, wherein mapping the plurality of blocks to a plurality of keyboard areas comprises;

selecting a subset of the plurality of blocks such that each block in the subset corresponds to a same type of UI control; and mapping the blocks in the subset to the plurality of keyboard areas.

14. The computer program product of claim 11, the program instructions executable by a processor to cause the processor to perform actions of:

providing audible messages for each UI control about the plurality of keys associated with the UI control.

* * * * *